(12) United States Patent
Ito (10) Patent No.: US 10,613,404 B2
(45) Date of Patent: Apr. 7, 2020

(54) LIQUID CRYSTAL OPTICAL ELEMENT AND OPTICAL APPARATUS

(71) Applicant: CANON KABUSHIKI KAISHA, Tokyo (JP)

(72) Inventor: Satoshi Ito, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/986,063

(22) Filed: May 22, 2018

(65) Prior Publication Data
US 2018/0341128 A1 Nov. 29, 2018

(30) Foreign Application Priority Data

May 24, 2017 (JP) ................................ 2017-102195
Mar. 8, 2018 (JP) ................................ 2018-042171

(51) Int. Cl.
| | | |
|---|---|---|
| *G02F 1/137* | (2006.01) | |
| *G02F 1/1337* | (2006.01) | |
| *G02F 1/1343* | (2006.01) | |
| *G02F 1/1335* | (2006.01) | |

(Continued)

(52) U.S. Cl.
CPC ............ *G02F 1/137* (2013.01); *G02F 1/1337* (2013.01); *G02F 1/1343* (2013.01); *G02F 1/133371* (2013.01); *G02F 1/133504* (2013.01); *G02F 1/133526* (2013.01); *G02F 1/29* (2013.01); *G02F 2001/13712* (2013.01); *G02F 2001/133738* (2013.01); *G02F 2001/133742* (2013.01); *G02F 2001/294* (2013.01)

(58) Field of Classification Search
CPC ......... G02F 1/137; G02F 2001/133738; G02F 1/1337; G02F 1/1343; G02F 1/133504; G02F 1/133526; G02F 1/133371; G02F 1/29; G02F 2001/133742; G02F 2001/13712; G02F 2001/294
USPC .......................................................... 349/33
See application file for complete search history.

(56) References Cited

U.S. PATENT DOCUMENTS 5,825,448 A * 10/1998 Bos .................... G02F 1/133753
349/128
7,728,949 B2 6/2010 Clarke et al.
(Continued)

FOREIGN PATENT DOCUMENTS

| JP | H06118416 A | 4/1994 |
|---|---|---|
| JP | H09015575 A | 1/1997 |

(Continued)

*Primary Examiner* — Nathanael R Briggs
*Assistant Examiner* — William D Peterson
(74) *Attorney, Agent, or Firm* — Rossi, Kimms & McDowell LLP (57) ABSTRACT

A liquid crystal optical element having a variable optical power includes a first substrate and a second substrate, a liquid crystal layer provided between the first substrate and the second substrate, an electrode configured to apply a voltage to the liquid crystal layer and to change the liquid crystal layer from an electro-inactive state to an electro-active state, a homogeneous alignment layer provided between the first substrate and the liquid crystal layer, a homeotropic alignment layer provided between the second substrate and the liquid crystal layer; and a diffraction grating provided on a surface of the second substrate on a side of the liquid crystal layer.

9 Claims, 5 Drawing Sheets

(51) Int. Cl.
*G02F 1/1333* (2006.01)
*G02F 1/29* (2006.01)

(56) References Cited

U.S. PATENT DOCUMENTS 9,488,842 B2 11/2016 Kizu et al.
2008/0180630 A1* 7/2008 Clarke .................. G02C 7/083
 349/201

FOREIGN PATENT DOCUMENTS

JP 2013137544 A 7/2013
WO 2013105240 A1 7/2013

* cited by examiner

LIQUID CRYSTAL OPTICAL ELEMENT AND OPTICAL APPARATUS

BACKGROUND OF THE INVENTION

Field of the Invention

The present invention relates to a liquid crystal element having a variable focus function.

Description of the Related Art

Known bifocal glasses for aged eyes use bifocal progressive lenses and bifocal lenses. However, each lens of the bifocal progressive lenses and bifocal lenses has a plurality of mixed lens areas having different optical powers (focal lengths), and may distort a distant scene, or cause partial defocuses or blurs, or another defect.

U.S. Pat. No. 7,728,949 discloses a liquid crystal (diffraction) lens that has a variable optical power in an aged-eye lens area, and provides no optical power to the aged-eye lens area when a user views a distant scene, and provides the optical power to the aged-eye lens area when the user views a near scene. The conventional liquid crystal lens, such as this type of liquid crystal lens, includes a substrate having a pair of flat surfaces, a substrate having a relief surface, and a liquid crystal material (liquid crystal layer) provided between these substrates. An alignment layer and an optically transparent electrode are formed on a surface of each substrate on the liquid crystal layer side. A rubbing process is performed for the alignment layer. The relative rotation alignment is necessary in the alignment direction between the alignment layers.

However, the rubbing process to the relief surface may deform or scratch the relief structure or pose another problem. In addition, the relative rotation alignment undesirably lowers the yield in each alignment direction on the alignment layer. Thus, the conventional liquid crystal lens has a variety of problems.

SUMMARY OF THE INVENTION

The present invention provides a liquid crystal optical element that has a variable optical power and can be easily manufactured A liquid crystal optical element having a variable optical power according to the present invention includes a first substrate and a second substrate, a liquid crystal layer provided between the first substrate and the second substrate, an electrode configured to apply a voltage to the liquid crystal layer and to change the liquid crystal layer from an electro-inactive state to an electro-active state, a homogeneous alignment layer provided between the first substrate and the liquid crystal layer, a homeotropic alignment layer provided between the second substrate and the liquid crystal layer, and a diffraction grating provided on a surface of the second substrate on a side of the liquid crystal layer.

Further features of the present invention will become apparent from the following description of exemplary embodiments with reference to the attached drawings.

DESCRIPTION OF THE EMBODIMENTS

Figure 1:
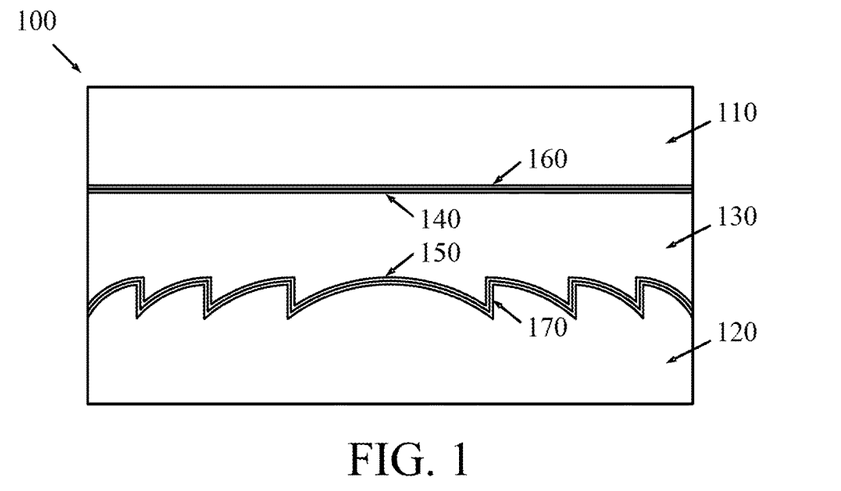
FIG. 1 is a sectional view illustrating a structure of a liquid crystal lens according to an embodiment of the present invention.

Referring now to the accompanying drawings, a description will be given of an embodiment of the present invention. FIG. 1 illustrates a sectional structure of a liquid crystal lens 100 (or the sectional structure in a light propagating thickness direction) as a liquid crystal optical element according to the embodiment of the present invention. The liquid crystal lens 100 according to this embodiment can turn into a plurality of optical states having different optical powers or focus states. These optical states can be generated by turning the following liquid crystal layer 130 into the electro-inactive state and the electro-active state. More specifically, for example, the liquid crystal lens has no significant optical power in the electro-inactive state (simply referred to as a "power" hereinafter), and a significant power (+2 D etc.) in the electro-active state. When this liquid crystal lens 100 is applied to the aged-eye glasses, the aged-eye glasses provides no power when the user views the distant scene and provides the power when the user views the near scene.

The liquid crystal lens 100 includes a first substrate 110 having a pair of flat or smooth surfaces, a second substrate 120 having a relief surface, and a liquid crystal layer 130 provided between the first substrate 110 and the second substrate 120. The flat surface may be a plane or curved surface. The relief shape on the relief surface on the liquid crystal layer side in the second substrate 120 constitutes the diffraction grating and may be shaped by mechanical working, mold transferring or etching etc. The relief surface is a surface in which the height (depth) has a periodically relief shape with about several times as long as the light wavelength.

A homogeneous alignment layer 140 is provided between the first substrate 110 and the liquid crystal layer 130. The homogeneous alignment layer 140 serves to collimate (make horizontal) the liquid crystal molecules in the liquid crystal layer 130 to the first substrate 110. The homogeneous alignment layer 140 is formed by irradiating linearly polarized UV onto an optical anisotropy material, such as azobenzene, and by aligning the molecules with a specific direction. An optically transparent single electrode 160 is provided between the first substrate 110 and the homogeneous alignment layer 140.

On the other hand, a homeotropic alignment layer 150 is provided between the second substrate 120 and the liquid crystal film 130. The homeotropic alignment layer 150 serves to align the liquid crystal molecules vertical to the second substrate 120. The homeotropic alignment layer 150 is made by introducing a hydrophobic structure, such as an alkyl group and a fluorine containing group, into an organic material, such as polyimide. Moreover, an optically transparent single electrode 170 is provided between the second substrate 120 and the homeotropic alignment layer 150.

Each of the electrodes 160 and 170 is made, for example, of indium tin oxide (ITO). The electrodes 160 and 170 are provided to apply the voltage to the liquid crystal layer 130 and to turn the liquid crystal layer 130 from the electro-inactive state to the electro-active state, as will be described later, and to change the refractive index and the refractive index dispersion of the liquid crystal layer 130. The liquid crystal material of the liquid crystal layer 130 is made of nematic liquid crystal having a negative dielectric anisotropy.

Figure 2:
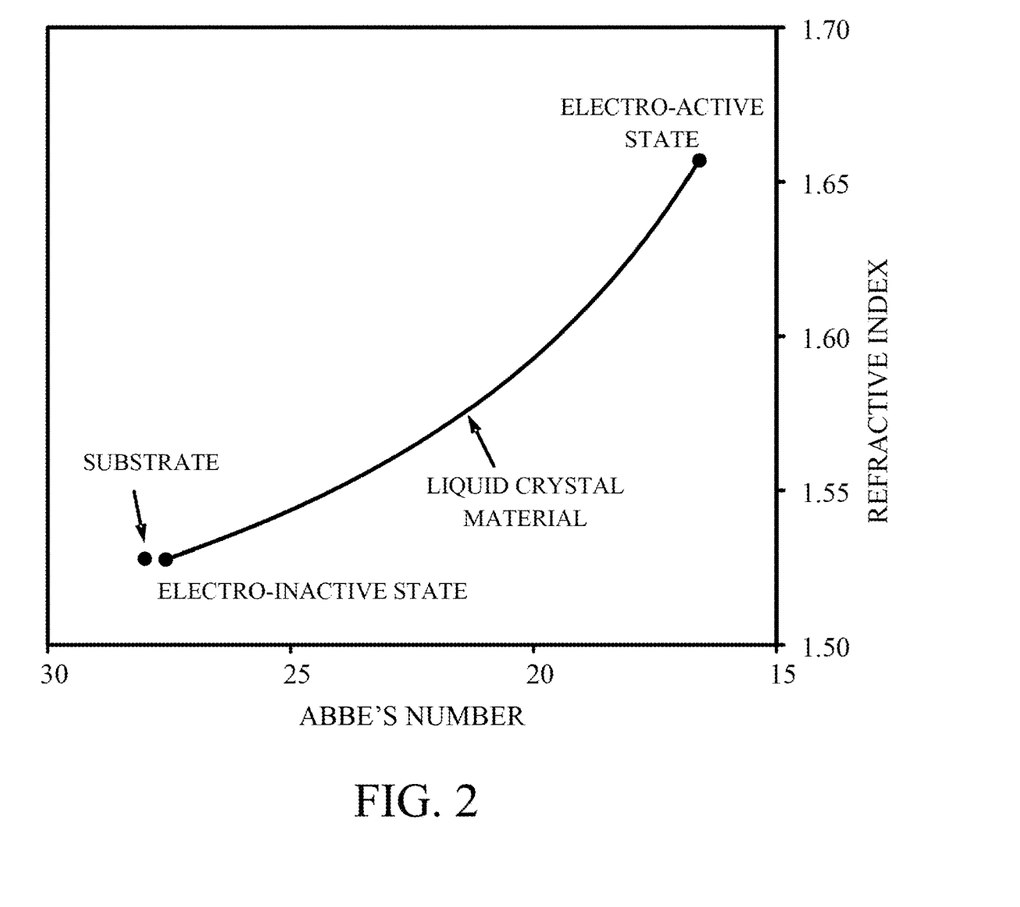
FIG. 2 illustrates a refractive index and a refractive index dispersion of a liquid crystal layer in the liquid crystal lens according to this embodiment.

FIG. 2 illustrates an example of the refractive index and the refractive index dispersion (Abbe's number) of the liquid crystal material in the liquid crystal layer 130. As illustrated in FIG. 2, the refractive index and the refractive index dispersion in the liquid crystal material change between the electro-inactive state and the electro-active state. More specifically, the refractive index and the refractive index dispersion in the liquid crystal material at the electro-inactive state are equal to those of each of the first substrate 110 and second substrate 120. Herein, the term "equal to" does not require a strict accordance and permit a slight difference that can be regarded as an approximate accordance, such as a range with a difference within 5%. The power little occurs in the electro-inactive state. The refractive index and the refractive index dispersion in the liquid crystal material in the electro-active state are turned relative to that in the electro-inactive state. The power is generated by a diffraction at the boundary with the second substrate 120 caused by a change of the refractive index. In other words, the liquid crystal lens 100 can change the power caused by the diffraction through the voltage.

In the example illustrated in FIG. 2, the refractive index $n_{sub}$ and the refractive index $v_{sub}$ of the first and second substrates 110 and 120 are $n_{sub}=1.528$ and $v_{sub}=28.00$. The refractive index no and the refractive index dispersion $v_0$ of the liquid crystal material in the electro-inactive state are $n_0=1.528$ and $v_0=27.57$. In addition, the refractive index n and the refractive index dispersion v of the liquid crystal material in the electro-active state are $n=1.657$ and $v=16.59$. This configuration can provide the liquid crystal lens 100 to have substantially no power in the electro-inactive state and a significant power in the electro-active state. In other words, in the liquid crystal lens 100, the power of the liquid crystal layer 130 in the electro-active state is larger than that in the electro-inactive state.

Figure 3:
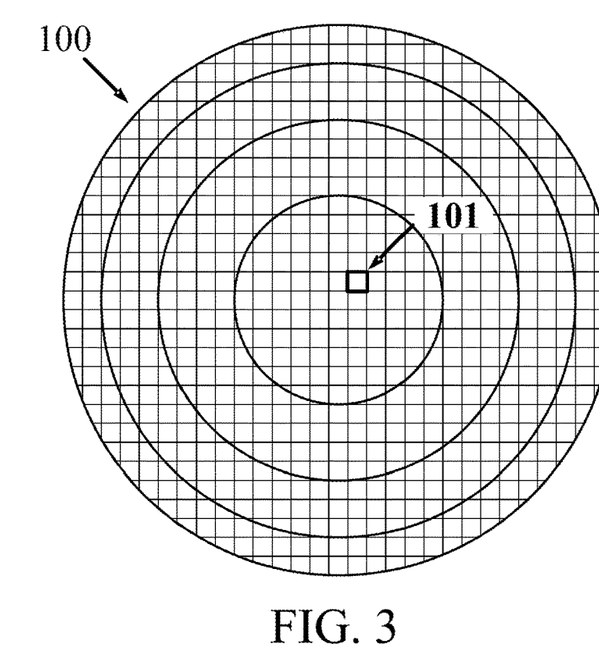
FIG. 3 is a plane view of the liquid crystal lens according to this embodiment.
Figure 4:
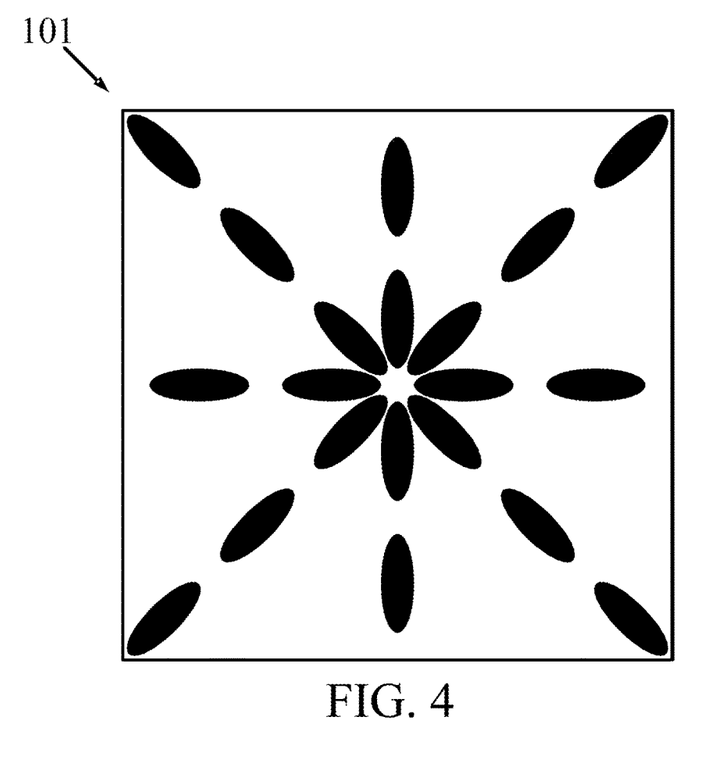
FIG. 4 is a plane view of liquid crystal molecules aligned by a horizontal alignment layer in the liquid crystal lens according to this embodiment.

FIG. 3 illustrates the liquid crystal lens 100 viewed from the light incident direction. The liquid crystal lens 100 includes a multiplicity of micro areas 101 in the two-dimensional direction. FIG. 4 illustrates the liquid crystal molecule aligned by the homogeneous alignment layer 140 in one micro area 101 in the same direction as FIG. 3. In the micro area 101, the liquid crystal molecules close to the homogeneous alignment layer 140 are radially aligned with the horizontal direction so that their long axis directions are parallel to the in-plane direction of the first substrate 110. The homogeneous alignment layer 140 is formed by irradiating the linearly polarized UV onto the light anisotropy material, such as azobenzene, and by aligning the molecules in the specific direction. Since the alignment layer can be controlled in the molecule alignment direction by changing the polarization direction according to the position of irradiating the linearly polarized light, the long axis directions of the liquid crystal molecules can be radially aligned as illustrated in FIG. 4. The material for the alignment layer is not limited to the optical anisotropy material, but may use a dimerization reaction material and a decomposition reaction material.

Figure 5:
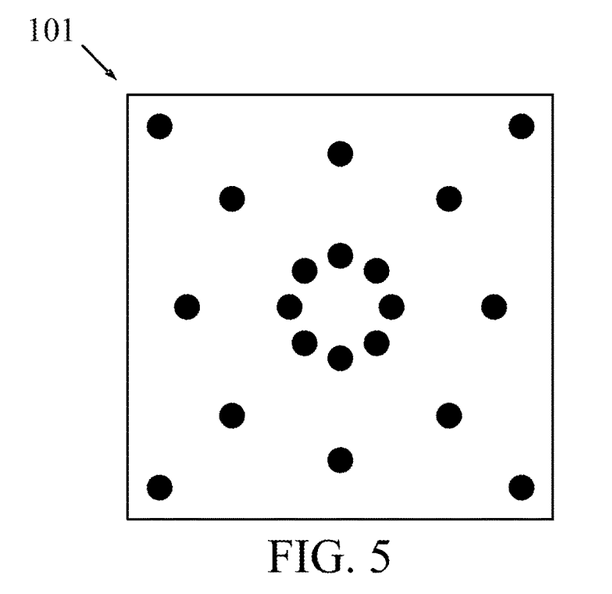
FIG. 5 is a plane view of liquid crystal molecules aligned by a homeotropic alignment layer in the liquid crystal lens according to this embodiment.

FIG. 5 illustrates the liquid crystal molecules aligned by the homeotropic alignment layer 150 in one micro area 101 in the liquid crystal lens 100 according to this embodiment viewed from the same direction as that of FIG. 3. In the micro area 101, the liquid crystal molecules close to the homeotropic alignment layer 150 are radially aligned so that their long axis directions are vertical to the in-plane direction of the second substrate 120. The homeotropic alignment layer 150 is formed by introducing a hydrophobic structure, such as an alkyl group and a fluorine containing group, into an organic material, such as polyimide. Thus, the homeotropic alignment layer 150 that does not require rubbing or optical alignment processing on the relief surface in the second substrate 120. This configuration can simplify the alignment process to the relief surface, and can easily manufacture the liquid crystal lens 100 without deforming or scratching the relief surface structure. In addition, a combination of the homogeneous alignment layer 140 and the homeotropic alignment layer 150 does not require the relative rotation alignment between two alignment layers that may lower the yield. This configuration can improve the yield in manufacturing the liquid crystal lens 100.

Figure 9:
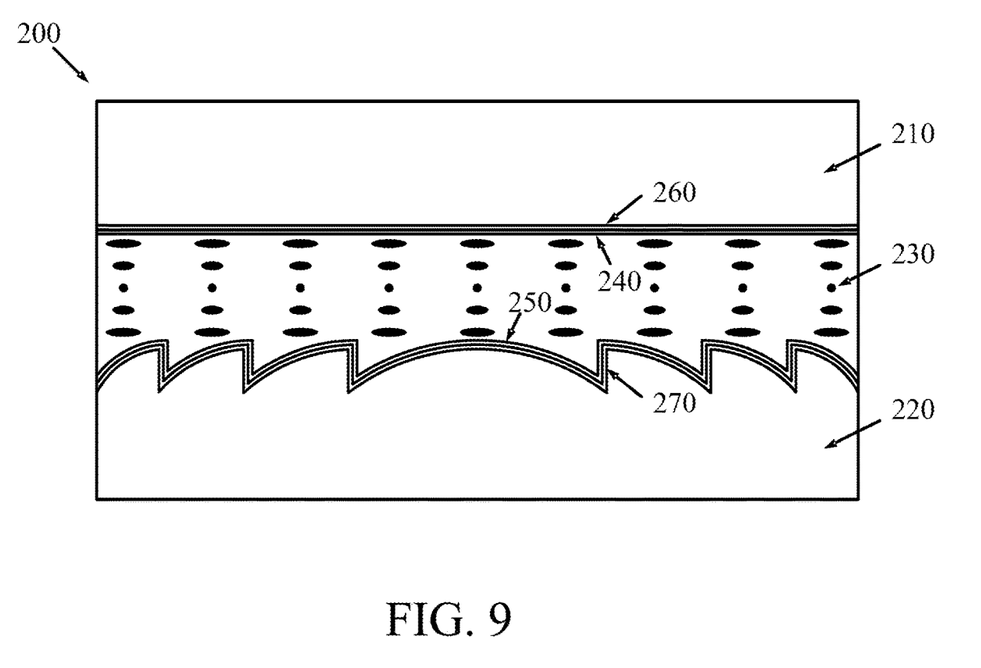
FIG. 9 is a sectional view of a structure of a conventional liquid crystal lens.

FIG. 9 illustrates a sectional structure of a conventional liquid crystal lens 200. The liquid crystal lens 200 includes a substrate 210 having a pair of flat or smooth surfaces, a substrate 220 having a relief surface, and a liquid crystal material (liquid crystal layer) 230 provided between the substrates 210 and 220. Alignment layers 240 and 250 and optically transparent electrodes 260 and 270 are formed on the surfaces of the two substrates 210 and 220 on the liquid crystal layer sides. The liquid crystal layer 230 is made of cholesteric liquid crystal or nematic liquid crystal layer to which a chiral twist agent is added. The voltage applied between the electrodes 260 and 270 changes the refractive index of the liquid crystal layer 230. Due to this liquid crystal, each of the alignment layers 240 and 250 needs the rubbing process or the photoalignment process that irradiates linearly polarized UV.

As illustrated in FIG. 9, a director in the liquid crystal molecule in the liquid crystal layer 230 is parallel to each substrate in the elector-inactive state (initial state). The director in the liquid crystal molecule spirally rotates over the thickness direction in the liquid crystal layer 230, and thereby realizes the polarization insensitivity. A length along the rotating axis until the director in the liquid crystal molecule rotates by 360° will be referred to as a twist pitch. The cholesteric liquid crystal has a wavelength corresponding to the twist pitch, and an average refractive index $n_{ave}=(n_o+n_e)/2$ for the light wave that propagates vertical to the director in the liquid crystal molecule. Herein, $n_o$ is an ordinary refractive index, and $n_e$ is an extraordinary refractive index.

When the electric field between the electrodes 260 and 270 is sufficiently strong, the director in the liquid crystal molecule faces the same directions as the electric field, and is vertical to the alignment direction. In this case, the cholesteric liquid crystal has a normal refractive index $n_o$ for the light wave that propagates parallel to the rotating axis of the director irrespective of the polarization state. Hence, the refractive index in the liquid crystal layer 230 depends on a magnitude of the applied voltage, and changes from the normal refractive index $n_o$ to the average refractive index $n_{ave}$. In order to set the refractive index in the cholesteric liquid crystal to a desired value, it is necessary to accurately control the twist pitch and to control the director in the liquid crystal molecules by the alignment layers 240 and 250. Hence, the rubbing process or the optical alignment process that irradiates the linearly polarized UV is necessary for each of the alignment layers 240 and 250. In addition, the relative rotating alignment is also necessary in the alignment direction in each of each of the alignment layers 240 and 250.

As described above, the rubbing process to the relief surface may deform or scratch the relief structure or cause another problem. In particular, the rubbing process is extremely difficult for a microstructure, such as a diffraction grating. The relative rotating alignment in each alignment direction of the alignment layers is not always easy.

Figure 6:
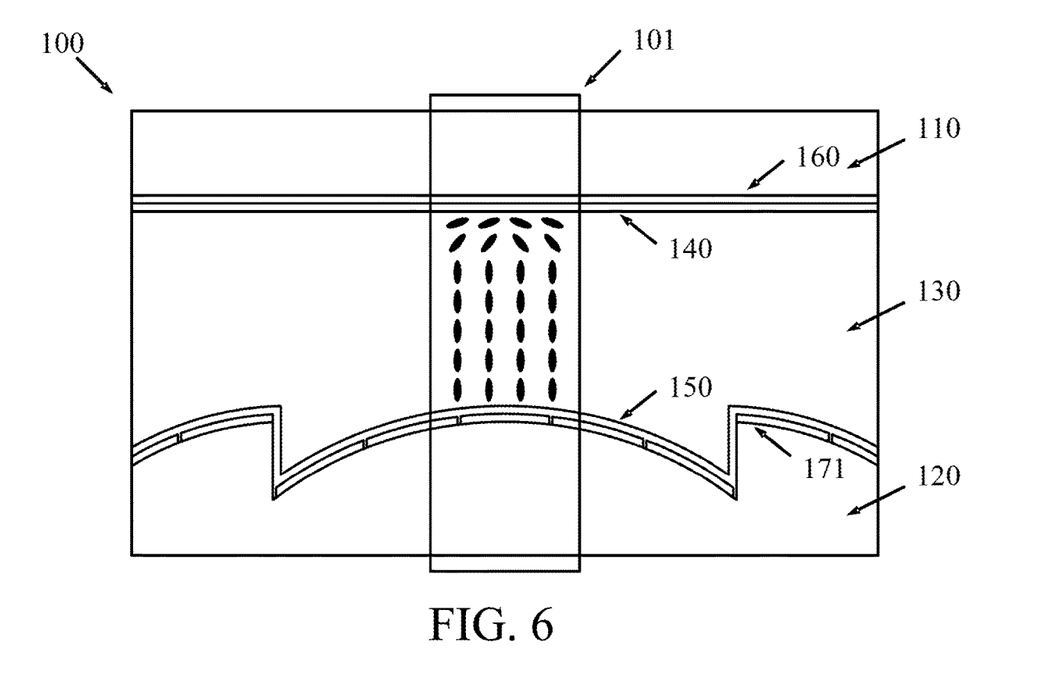
FIG. 6 is a sectional view of an alignment in an electro-inactive state in the liquid crystal layer in the liquid crystal lens according to this embodiment.

FIG. 6 illustrates an alignment of the liquid crystal molecules in one micro area 101 when the liquid crystal layer 130 has the electro-inactive state in the liquid crystal lens 100 according to this embodiment on the same section as that of FIG. 1. FIG. 6 enlarges the micro area 101. Reference numeral 171 denotes an electrode portion segmented for each micro area 101 in the electrode 170 (or according to the relief on the relief surface).

The liquid crystal molecules close to the homogeneous alignment layer 140 in the liquid crystal layer 130 are radially aligned in the horizontal direction, and the liquid crystal molecules close to the homogeneous alignment layer 140 are vertically aligned. An anchoring effect caused by the homogeneous and homeotropic alignment layers 140 and 150 disappears in an area sufficiently distant from an interface between the first substrate 110 and the second substrate 120 in the liquid crystal layer 130. Since the liquid crystal material has a negative dielectric anisotropy, the liquid crystal molecules in an area sufficiently distant from the homogeneous and homeotropic alignment layers 140 and 150 are approximately vertically aligned in the electro-inactive state. Hence, the liquid crystal layer 130 in the electro-inactive state has a constant refractive index for the light that propagates in the thickness direction of the liquid crystal lens 100 irrespective to the light polarization direction.

Figure 7:
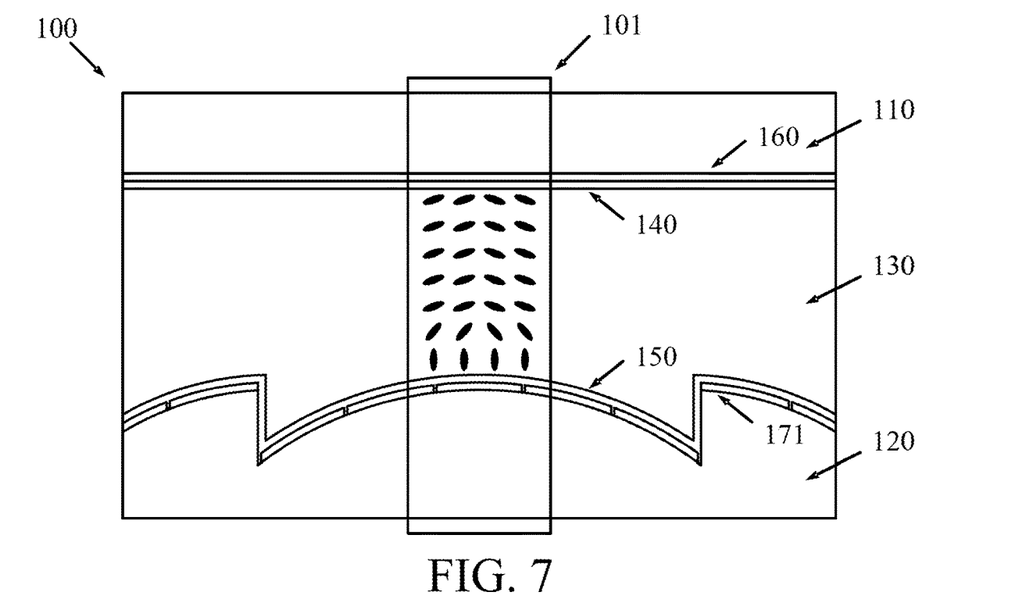
FIG. 7 is a sectional view of an alignment in an electro-active state in the liquid crystal layer according to this embodiment.

FIG. 7 illustrates an alignment of the liquid crystal molecules in one micro area 101 when the liquid crystal layer 130 is in the electro-active state in the liquid crystal lens 100 according to this embodiment on the same section as that of FIG. 1. FIG. 7 also enlarges the micro area 101. Similar to FIG. 6, the electrode portion 171 is segmented for each micro area 101 and thus the applied voltage can be made different between the micro areas having different thicknesses of the liquid crystal material in the liquid crystal layer 130. This configuration can make equal the electric field intensity even when the thicknesses of the liquid crystal materials have different thicknesses in all micro areas and the liquid crystal layer 130 can have an equal refractive index over all micro areas.

Similar to the electro-active state, the liquid crystal molecules close to the homogeneous alignment layer 140 in the liquid crystal layer 130 are radially aligned with the horizontal direction, and the liquid crystal molecules close to the homeotropic alignment layer 150 are vertically aligned. An anchoring effect caused by the homogeneous and homeotropic alignment layers 140 and 150 disappears in an area sufficiently distant from an interface between the first substrate 110 and the second substrate 120 in the liquid crystal layer 130.

Herein, as the liquid crystal material has a negative dielectric anisotropy as described above, the liquid crystal molecules in an area sufficiently distant from the homogeneous and homeotropic alignment layers 140 and 150 are approximately horizontally aligned in the electro-active state. Since the liquid crystal material used for this embodiment is nematic liquid crystal, the director of the liquid crystal molecule does not spirally rotate over the thickness direction and has approximately the same orientation over the thickness direction unlike the cholesteric liquid crystal. Hence, the refractive index in the liquid crystal layer 130 for the light propagating the thickness direction may differ according to the light polarization direction. In other words, the power of the liquid crystal lens 100 depends on the polarization and has a characteristic unsuitable for a lens for glasses.

As a solution for this problem, the liquid crystal lens 100 according to this embodiment radially aligns the liquid crystal molecules in the micro area 101 with the horizontal direction. This configuration enables the long axis directions of the liquid crystal molecules in the micro area 101 to substantially face every direction, and the liquid crystal layer 130 has a constant refractive index in average for the light in all polarization directions. Thereby, the liquid crystal lens 100 has a polarization insensitivity in the electro-active state.

The liquid crystal material in the liquid crystal layer 130 in the liquid crystal lens 100 may have a birefringence index of 0.08 or higher. A uniaxial optical material that contains the liquid crystal material has the ordinary refractive index $n_o$ and the extraordinary refractive index $n_e$ and the birefringence index is defined as a difference between them as $n_e-n_o$. This embodiment uses the ordinary refractive index $n_o$=1.528 and the extraordinary refractive index $n_e$=1.786 for the liquid crystal material. In this case, the birefringence index of the liquid crystal material is 0.258. Thus, the liquid crystal material having a birefringence index of 0.1 or higher can widen a dynamic range of the changing refractive index as the electro-inactive state is turned into the electro-active state, and facilitate controls over the refractive index in the electro-active state.

It is necessary for the aged-eye glasses using the above liquid crystal lens 100 to reduce the negative influence on the user when the voltage cannot be applied to the liquid crystal layer 130 due to the breakdown or the power shortage. The general aged-eye glasses rectify the eyesight of the user so as to focus on the distant vision and adds the power to the aged-eye lens area so as to supplement the insufficient adjusting power to the liquid crystal material when the focus is moved to the near vision. Therefore, the liquid crystal lens 100 may have no power in the electro-inactive state that applies no voltage to the liquid crystal material, and the liquid crystal lens 100 may have the power in the electro-active state that applies the voltage to the liquid crystal material. This configuration can initialize the liquid crystal lens 100 to the state focused on the distant vision, and reduce the negative influence on the user, even when no voltage can be applied to the liquid crystal layer 130 due to the breakdown etc.

In order to realize this structure, in the liquid crystal lens 100 according to this embodiment, the refractive index of the liquid crystal layer 130 in the electric-inactive state may be equal to that of each of the first substrate 110 and the second substrate 120, as illustrated in FIG. 2. A range in which the refractive index can be considered equal may mean that a refractive index difference between the liquid crystal layer 130 in the electric-inactive state and the first substrate 110 or the second substrate 120 is 0.02 or smaller or 0.01 or smaller. This configuration enables the user to focus the liquid crystal lens 100 on the distant vision without generating the power in the liquid crystal lens 100 when the liquid crystal layer 130 has the electro-inactive state.

Moreover, in the liquid crystal lens 100 according to this embodiment, the refractive index dispersion of the liquid crystal layer 130 in the electric-inactive state may be equal to that of each of the first substrate 110 and the second substrate 120. A range in which the refractive index dispersion is considered equal may mean that a refractive index dispersion difference between the liquid crystal layer 130 in the electro-inactive state and the first substrate 110 or the second substrate 120 is 5.0 or smaller or 1.0 or smaller. This configuration can realize the liquid crystal lens 100 having few chromatic aberrations without generating the power for light with a designed wavelength, such as visible light, as well as another wavelength, in the electro-inactive state of the liquid crystal layer 130.

In this embodiment, the liquid crystal lens 100 turns between two states or between the power applied state and the powerless state through an application and an nonapplication of the voltage to the liquid crystal layer 130. The power in the liquid crystal lens 100 can be changed by controlling the voltage applied to the liquid crystal layer 130. For example, once the refractive index in the substrate is made equal to a middle value between the refractive index in the activation state and the refractive index in the inactivation state of the liquid crystal, 0V can set −2 D, 5V can set 0 D, and 10V can set +2 D.

Figure 8:
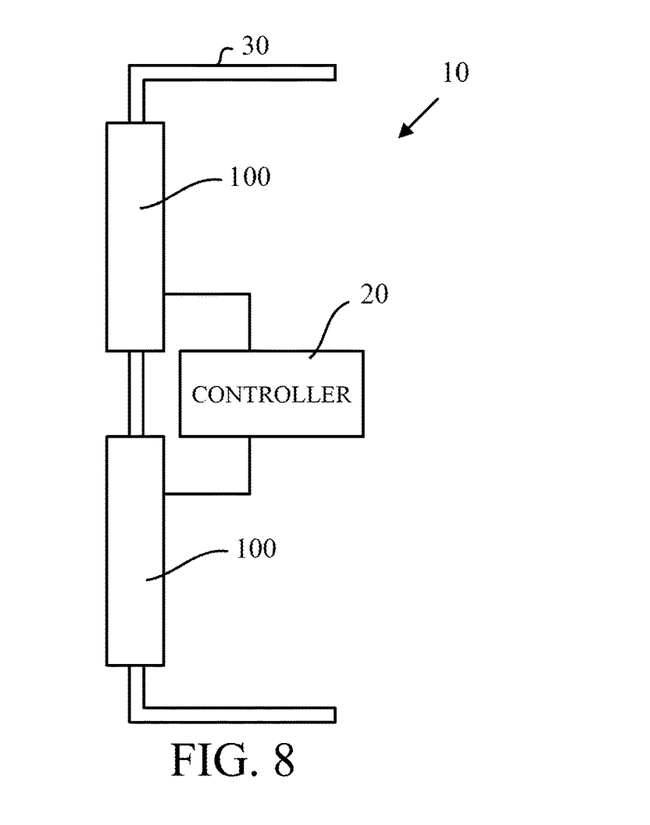
FIG. 8 illustrates an optical apparatus using the liquid crystal lens according to this embodiment.

FIG. 8 illustrates a pair of glasses (aged-eye glasses) 10 as an optical apparatus that includes the liquid crystal lens 100 according to this embodiment. The lenses for the glasses 10 may use the liquid crystal lens 100.

A glass frame 30 holds two liquid crystal lenses 100 for left and right eyes. A controller 20 controls the voltage applied to the liquid crystal layer 130 via the electrodes 160 and 170 in each liquid crystal lens 100, and switches the liquid crystal layer between the electro-inactive state and the electro-active state or switches the liquid crystal lens 100 between the power applied state and the powerless state.

The liquid crystal lens 100 or the liquid crystal element having a similar structure is not limited to the glasses, and may be applied to a variety of optical apparatuses, such as a binocular and a head mount display. This embodiment can easily manufacture the liquid crystal optical element having a plurality of states with different powers and the optical apparatus using the same.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2017-102195, filed on May 24, 2017, and 2018-042171, filed on Mar. 8, 2018, each of which is hereby incorporated by reference herein in its entirety.

What is claimed is:

1. A liquid crystal optical element having a variable optical power, the liquid crystal optical element comprising:
   a first substrate and a second substrate;
   a liquid crystal layer provided between the first substrate and the second substrate;
   an electrode configured to apply a voltage to the liquid crystal layer and to change the liquid crystal layer from an electro-inactive state to an electro-active state;
   a homogeneous alignment layer provided between the first substrate and the liquid crystal layer;
   a homeotropic alignment layer provided between the second substrate and the liquid crystal layer; and
   a diffraction grating provided on a surface of the second substrate on a side of the liquid crystal layer,
   wherein, when the liquid crystal layer is view from a side of the homogenous alignment layer, long axis directions of liquid crystal molecules of the liquid crystal layer are radially aligned in an area facing the homogeneous alignment layer.

2. The liquid crystal optical element according to claim 1, wherein the electrode is provided on a surface of the diffraction grating facing the homeotropic alignment layer other than a surface of the diffraction grating along a thickness direction of the liquid crystal optical element.

3. The liquid crystal optical element according to claim 1, wherein the first substrate includes a flat surface on the side of the liquid crystal layer.

4. The liquid crystal optical element according to claim 1, wherein the electrode is segmented in accordance with a relief shape of the diffraction grating.

5. The liquid crystal optical element according to claim 1, wherein a liquid crystal material of the liquid crystal layer is made of a nematic liquid crystal having a negative dielectric anisotropy.

6. The liquid crystal optical element according to claim 1, wherein a liquid crystal material of the liquid crystal layer has a birefringence index of 0.1 or higher.

7. The liquid crystal optical element according to claim 1, wherein the refractive index of the liquid crystal layer is equal to that of each of the first substrate and the second substrate in the electro-inactive states.

8. The liquid crystal optical element according to claim 1, wherein a different between an Abbe's number of the liquid crystal layer and an Abbe's number of each of the first substrate and the second substrate is 5.0 or smaller in the electro-inactive states.

9. An optical apparatus comprising:
   a liquid crystal optical element having a variable optical power, and including:
   a first substrate and a second substrate;
   a liquid crystal layer provided between the first substrate and the second substrate;
   an electrode configured to apply a voltage to the liquid crystal layer and to change the liquid crystal layer from an electro-inactive state to an electro-active state;
   a homogeneous alignment layer provided between the first substrate and the liquid crystal layer;
   a homeotropic alignment layer provided between the second substrate and the liquid crystal layer; and
   a diffraction grating provided on a surface of the second substrate on a side of the liquid crystal layer,
   wherein, when the liquid crystal layer is view from a side of the homogenous alignment layer, long axis directions of liquid crystal molecules of the liquid crystal layer are radially aligned in an area facing the homogeneous alignment layer; and
   a controller configured to control the voltage.

* * * * *